United States Patent
Suzuki (10) Patent No.: US 10,038,814 B2
(45) Date of Patent: Jul. 31, 2018

(54) PRINTING APPARATUS, PRINT CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tetsuya Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/376,148

(22) Filed: Dec. 12, 2016

(65) Prior Publication Data
US 2017/0187913 A1   Jun. 29, 2017

(30) Foreign Application Priority Data
Dec. 25, 2015   (JP) .................................. 2015-254330

(51) Int. Cl.
| | |
|---|---|
| H04N 1/32 | (2006.01) |
| B41M 3/10 | (2006.01) |
| B41M 7/00 | (2006.01) |
| B41J 29/38 | (2006.01) |
| B41M 5/382 | (2006.01) |

(52) U.S. Cl.
CPC .......... *H04N 1/32325* (2013.01); *B41J 29/38* (2013.01); *B41M 3/10* (2013.01); *B41M 5/382* (2013.01); *B41M 7/0036* (2013.01); *H04N 2201/3242* (2013.01)

(58) Field of Classification Search
CPC ................................... B41J 2/325; B41M 3/10
See application file for complete search history.

(56) References Cited

U.S. PATENT DOCUMENTS

| | | | | |
|---|---|---|---|---|
| 2002/0105572 A1* | 8/2002 | Testardi | ..................... | B41J 2/01 347/107 |
| 2002/0118377 A1* | 8/2002 | Hirumi | ................... | B41M 3/10 358/1.7 |
| 2005/0270550 A1* | 12/2005 | Sumio | .................. | G06F 3/1205 358/1.13 |
| 2009/0040539 A1* | 2/2009 | Inagaki | ................... | B41J 2/325 358/1.9 |

(Continued)

FOREIGN PATENT DOCUMENTS

JP   2002-240402 A   8/2002

*Primary Examiner* — Shelby Fidler
(74) *Attorney, Agent, or Firm* — Canon USA, Inc. I.P. Division (57) ABSTRACT

In one or more embodiments, a control unit reads image data and date information of a main image from a memory card into a RAM. When a watermark printing is set, the control unit combines characters of the date information having a high gradation value with overcoat layer data having a mixture pattern in which pixels having a high gradation value and pixels having a low gradation value are located randomly or alternately in rows and columns to generate overcoat layer print data and stores the data in an overcoat layer data storage area. The control unit generates CMY print data from the image data of the main image to print it on image-receiving paper by using a print processing section. After printing of the main image, the control unit prints the overcoat layer print data so that it is superimposed on the main image on the image-receiving paper.

11 Claims, 6 Drawing Sheets

(56) References Cited

U.S. PATENT DOCUMENTS

| | | | |
|---|---|---|---|
| 2009/0111037 A1* | 4/2009 | Evans | B41M 7/0027 430/30 |
| 2009/0145537 A1* | 6/2009 | Suzuki | B41J 2/36 156/234 |
| 2009/0153639 A1* | 6/2009 | Shinohara | B41J 2/36 347/188 |
| 2013/0201269 A1* | 8/2013 | Hozumi | B41J 2/325 347/187 |
| 2016/0303869 A1* | 10/2016 | Suzuki | B41J 2/325 |

* cited by examiner

PRINTING APPARATUS, PRINT CONTROL METHOD, AND NON-TRANSITORY COMPUTER-READABLE STORAGE MEDIUM

BACKGROUND OF THE INVENTION

Field of the Invention

The present disclosure relates to a printing apparatus for printing supplemental information, such as a date, a print control method and a storage medium for use therewith.

Description of the Related Art

In a print obtained by performing printing on image-receiving paper via a dye-sublimation printer, an overcoat layer that protects transferred dye ink components has thermally adhered to an image-receiving layer of the image-receiving paper. The gloss of the overcoat layer varies according to the level of thermal adhesion energy (print gradation value) in thermal adhesion of the overcoat layer.

Japanese Patent Laid-Open No. 2002-240402 discloses a watermark printing technology in which the gloss of an overcoat layer is changed by changing a print gradation value to record supplemental information, such as a date, in the overcoat layer.

The level of a print gradation value changes not only the gloss but also the thickness of the overcoat layer itself. This is because, when thermal adhesion energy is high, the overcoat layer subjected to thermal adhesion contracts. For example, a large amount of heating (a high gradation value) makes the overcoat layer thinner and bluish, and a small amount of heating (a low gradation value) makes the overcoat layer thicker and reddish. As a result, supplemental information recorded in the overcoat layer has a bluish-green tint according to thermal adhesion energy in recording the supplemental information, whereas a portion (background) in which no supplemental information is recorded has a reddish tint, thereby reducing the visibility of a printed image.

SUMMARY OF THE INVENTION

One or more aspects of at least one embodiment of the present disclosure are directed to a printing apparatus capable of providing good visibility even if supplemental information is recorded or printed in an overcoat layer, and a print control method.

According to an aspect of at least one embodiment of the present disclosure, there is provided a printing apparatus that prints an overcoat layer on printing paper on which a main image has been printed. The printing apparatus includes an acquisition unit configured to acquire supplemental information, and a control unit configured to perform control so that the overcoat layer is printed based on overcoat layer print data. In a case where the supplemental information acquired by the acquisition unit is printed by using an overcoat layer, the control unit performs control so that the overcoat layer is printed based on overcoat layer print data generated by combining the supplemental information formed in a mixture pattern in which a high gradation value and a low gradation value are arranged, or formed with a high gradation value, with a mixture pattern in which a high gradation value and a low gradation value are arranged.

According to other aspects of the present disclosure, one or more additional printing apparatuses, one or more control methods and one or more storage mediums are discussed herein. Further features of the present disclosure will become apparent from the following description of exemplary embodiments with reference to the attached drawings.

DESCRIPTION OF THE EMBODIMENTS

Embodiments of a printing apparatus, a print control method and a storage medium according to the present disclosure will be described in detail below with reference to the drawings.

First Embodiment

Figure 1:
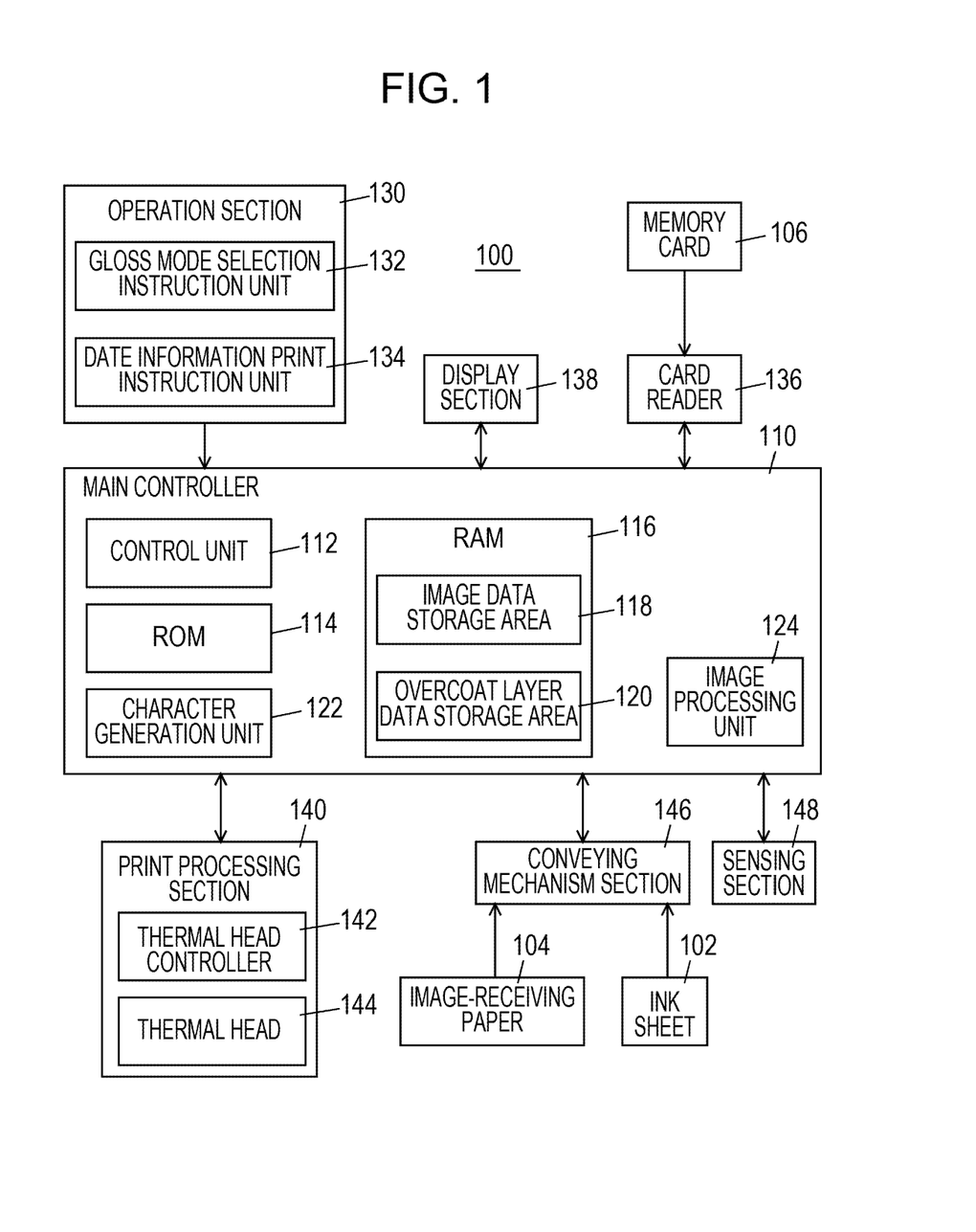
FIG. 1 is a schematic configuration block diagram of an embodiment of the present disclosure.

FIG. 1 is a schematic configuration block diagram of at least one embodiment of a printing apparatus according to the present disclosure.

A printing apparatus 100 illustrated in FIG. 1 is a dye-sublimation printer. An ink sheet 102 on which dyes of colors of cyan, magenta, and yellow are applied is loaded in the printing apparatus 100, and the printing apparatus 100 prints an input image on image-receiving paper 104. A memory card 106 storing data, such as image data, is attachable to and detachable from the printing apparatus 100.

The printing apparatus 100 broadly includes a main controller 110, an operation section 130, a card reader 136, a display section 138, a print processing section 140, a conveying mechanism section 146, and a sensing section 148.

A control unit 112 of the main controller 110 controls the printing apparatus 100 and also has a function of reading image-capture information, such as exchangeable image file format (EXIF) information, from image data stored in the memory card 106 inserted into the card reader 136. A read only memory (ROM) 114 stores correction data for gamma correction or the like, and various types of overcoat layer pattern data. A random access memory (RAM) 116 is used as a working memory for the control unit 112. In the RAM 116, an image data storage area 118 that stores image data, and an overcoat layer data storage area 120 that stores overcoat layer pattern data are prepared.

A character generation unit 122 of the main controller 110 translates text data, such as date data, into an image in a certain font. An image processing unit 124 takes charge of performing correction processing, such as gamma correction, on image data, a combining process of supplemental information, and a combining process of supplemental information with overcoat layer pattern data. The image processing unit 124 stores processed image data in the image data storage area 118 and stores processed overcoat layer data in the overcoat layer data storage area 120. The character generation unit 122 reads date data from image-capture information read by the control unit 112 and converts it into an image data format.

The operation section 130 is a section through which a user's instruction is input to the main controller 110 and has a gloss mode selection instruction unit 132 and a date information print instruction unit 134. A user can select one of "gloss" and "pattern" as a gloss mode for a print setting regarding overcoat layer printing via the gloss mode selection instruction unit 132. The user can select any one of "date", "no date", and "watermark" for a print setting regarding date printing via the date information print instruction unit 134.

The card reader 136 reads image data stored in the memory card 106 inserted thereinto under the control of the control unit 112 and supplies the image data to the image processing unit 124 of the main controller 110.

The display section 138 is constituted by a liquid crystal display panel or the like and displays image data read from the memory card 106, an operation menu, and the like.

The print processing section 140 is a section that prints an image and necessary supplemental information on the image-receiving paper 104 under the control of the control unit 112 and includes a thermal head controller 142 and a thermal head 144. The thermal head controller 142 converts image data and overcoat layer pattern data stored in the RAM 116 into driving data for driving the thermal head 144. In accordance with the driving data from the thermal head controller 142, the thermal head 144 prints an image on the image-receiving paper 104 and causes an overcoat layer to thermally adhere to the image-receiving paper 104. In this embodiment, supplemental information, such as an image-capture date, is recorded in or fixed to the overcoat layer in a specific pattern, more details on which will be given below.

The conveying mechanism section 146 is a section that conveys the image-receiving paper 104 and the ink sheet 102 to a position where they come into contact with the thermal head 144 and conveys them to respective positions away from the thermal head 144 after image printing.

The sensing section 148 detects the presence or absence and positions of the image-receiving paper 104 and the ink sheet 102 to notify the control unit 112 of detection results.

Figure 2A:
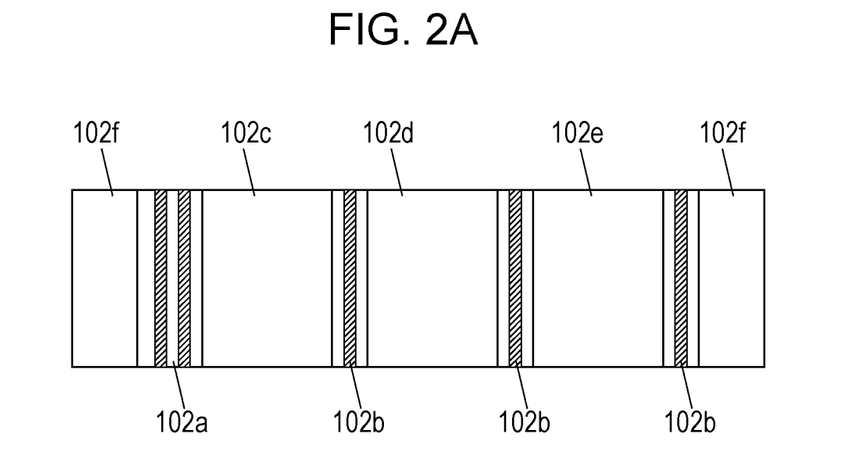
FIGS. 2A and 2B each illustrate the structure of an ink sheet.
Figure 2B:
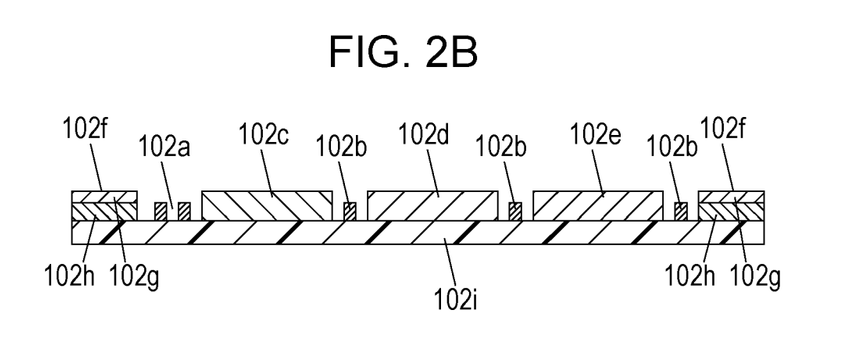

FIG. 2A illustrates a planar structure of the ink sheet 102, and FIG. 2B illustrates a cross-sectional structure of the ink sheet 102. Reference numerals 102a and 102b each refer to a search marker. Reference numerals 102c, 102d, 102e, and 102f respectively refer to a yellow ink sheet, a magenta ink sheet, a cyan ink sheet, and a transparent overcoat material sheet. Reference numerals 102g and 102h respectively refer to a thermal adhesive sheet and an overcoat sheet. Both the thermal adhesive sheet 102g and the overcoat sheet 102h constitute the transparent overcoat material sheet 102f. Reference numeral 102i refers to a resin sheet, and the sheets 102c to 102h and the search markers 102a and 102b are applied on the resin sheet 102i. The ink sheet 102 is housed in an ink sheet cassette with it being wound up by a supply bobbin.

Figure 3A:
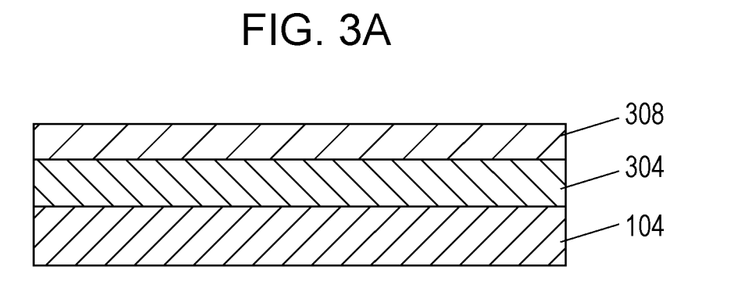
FIGS. 3A and 3B respectively illustrate the structure of image-receiving paper subjected to printing and an example of a main image.
Figure 3B:
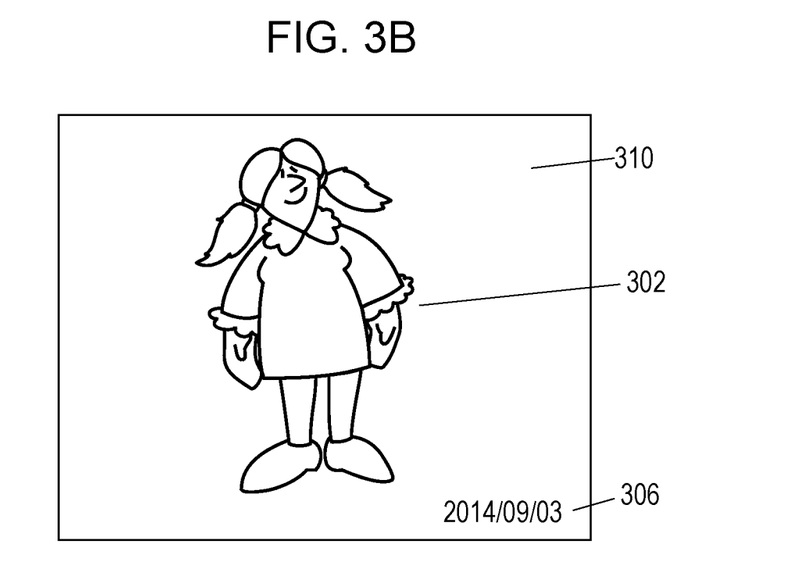

FIG. 3A illustrates a cross-sectional structure of the image-receiving paper 104 subjected to printing, and FIG. 3B illustrates an example of an image and supplemental information of the image that are fixed to the image-receiving paper 104. An image-receiving layer 304 in which a main image 302 is recorded is formed on the image-receiving paper 104, and an overcoat layer 308 in which supplemental information 306 is recorded is formed so that it is superimposed on the image-receiving layer 304. A background portion 310 except characters of the supplemental information 306 is formed in a mixture pattern, which will be described, of the overcoat layer 308 on the image-receiving layer 304.

Figure 4:
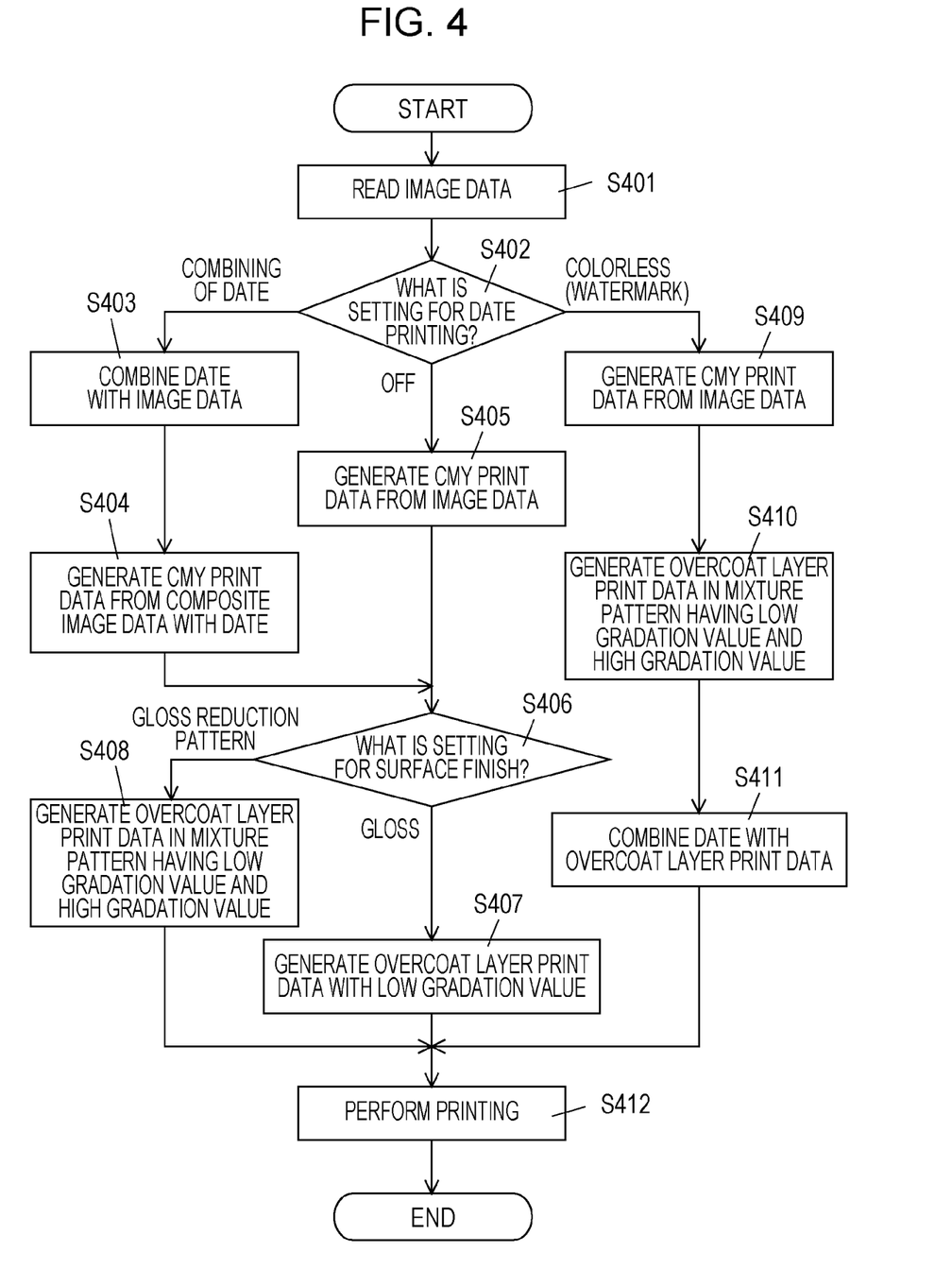
FIG. 4 is a flowchart of a printing process according to at least one embodiment.

FIG. 4 is a flowchart of a print control operation performed by the control unit 112. The user inserts the memory card 106 storing image data into the card reader 136 and selects an image to be printed to specify print conditions (for example, a gloss mode and date printing) and input a print start instruction via the operation section 130. In response to the print start instruction, the control unit 112 starts a printing process in accordance with the flowchart of FIG. 4.

In step S401, the control unit 112 reads image data specified as data to be printed and date data of the image data from the memory card 106 into the image data storage area 118. Date data is, for example, image-capture date and time data that is recorded together with image data when a camera captures an image.

In step S402, the control unit 112 reads a setting for date printing instructed via the date information print instruction unit 134. Settings for date printing are "combining of date", "off", and "colorless (watermark)". "Combining of date" is a setting (a date combining mode, more typically, a supplemental information combining mode) specifying that a date is combined with a main image and printed, and the color of the date is set to orange to increase visibility. "Off" is a setting or mode specifying that no date is printed. "Colorless (watermark)" is a watermark mode specifying that a date is printed as a watermark in an overcoat layer. If the setting for date printing is "combining of date", the control unit 112 proceeds to step S403. If the setting for date printing is "off" (S402), the control unit 112 proceeds to step S405. If the setting for date printing is "colorless (watermark)" (S402), the control unit 112 proceeds to step S409.

In step S403, the control unit 112 translates the date data in the image data storage area 118 into an image by using the character generation unit 122 and combines the image with the image data (main image) in the image data storage area 118. The color of the date image is set to orange to enhance visibility. The control unit 112 writes image data of a composite image of the main image and the date image back into the image data storage area 118.

In step S404 following step S403, the control unit 112 generates print data for each of the colors of cyan, magenta, and yellow from the composite image data with the date in the image data storage area 118. Specifically, the control unit 112 reads the composite image data from the image data storage area 118 to supply it to the print processing section 140. The thermal head controller 142 of the print processing section 140 converts the received composite image data into print data for each of the colors of cyan, magenta, and yellow and holds it until printing starts. The control unit 112 and the thermal head controller 142 function as a print data generation unit that generates print data of the main image. After step S404, the control unit 112 proceeds to step S406.

In step S405, the control unit 112 generates print data for each of the colors of cyan, magenta, and yellow from the image data (the image data of the main image specified as an image to be printed) in the image data storage area 118. Specifically, the control unit 112 reads the image data (the image data of the main image specified as an image to be printed) in the image data storage area 118 to supply it to the print processing section 140. The thermal head controller 142 of the print processing section 140 converts the received image data into print data for each of the colors of cyan, magenta, and yellow and holds it until printing starts. After step S405, the control unit 112 proceeds to step S406.

In step S406, the control unit 112 determines whether a setting specified via the gloss mode selection instruction unit 132 is "gloss" or "gloss reduction pattern". If "gloss" is set (S406), the control unit 112 causes in step S407 the image processing unit 124 to generate overcoat layer print data having a single low gradation value and writes the generated overcoat layer print data into the overcoat layer data storage area 120.

If "gloss reduction pattern" is set (S406), the control unit 112 causes in step S408 the image processing unit 124 to generate overcoat layer print data having a mixture pattern in which pixels having a low gradation value and pixels having a high gradation value are located randomly or alternately in rows and columns. It is known that such a mixture pattern enables a reduction in the gloss of an overcoat layer. The control unit 112 writes the overcoat layer print data generated in step S408 into the overcoat layer data storage area 120.

Overcoat layer print data to be generated in each of steps S407 and S408 may be generated in advance and stored in the ROM 114. Then, the control unit 112 may read overcoat layer print data corresponding to a gloss mode setting from the ROM 114 to write it into the overcoat layer data storage area 120.

In step S409, as in step S405, the control unit 112 generates print data for each of the colors of cyan, magenta, and yellow from the image data (the image data of the main image specified as an image to be printed) in the image data storage area 118. Specifically, the control unit 112 reads the image data (the image data of the main image specified as an image to be printed) in the image data storage area 118 to supply it to the print processing section 140. The thermal head controller 142 of the print processing section 140 converts the received image data into print data for each of the colors of cyan, magenta, and yellow and holds it until printing starts.

In step S410 following step S409, as in step S408, the control unit 112 causes the image processing unit 124 to generate overcoat layer print data having a mixture pattern in which pixels having a low gradation value and pixels having a high gradation value are distributed randomly or alternately in rows and columns. The image processing unit 124 functions as a generation unit that generates overcoat layer print data.

In step S411, the control unit 112 translates the date data in the image data storage area 118 into an image by using the character generation unit 122 and combines obtained date image data with the overcoat layer print data generated in step S410. The date image data is generated with a constant high gradation value to enhance visibility. The control unit 112 writes the overcoat layer print data in which the date is combined in this way back into the overcoat layer data storage area 120. By also using a method of overwriting a specified portion of the overcoat layer print data in the overcoat layer data storage area 120 with the date image data having a high gradation value, the overcoat layer print data in which the date image is combined can be obtained.

In watermark printing, when an overcoat layer has a mixture pattern in which pixels having a low gradation value and pixels having a high gradation value are located randomly or alternately in rows and columns as in this embodiment, the gloss of the overcoat layer is reduced, thereby reducing a difference in hue between a character portion and the other background portion. This can enhance visibility and greatly reduce an effect on color tones of the main image.

In step S412 following each of steps S407, S408, and S411, the control unit 112 controls the print processing section 140 and the conveying mechanism section 146 to print the main image and an overcoat layer on the image-receiving paper 104.

The control unit 112 controls the conveying mechanism section 146 to wind up the ink sheet 102 until the sensing section 148 detects the search marker 102a of the ink sheet 102. When the search marker 102a is detected, the control unit 112 controls the conveying mechanism section 146 to take the image-receiving paper 104 placed in an image-receiving paper tray into the printing apparatus 100 and to convey it to a print start position. At the print start position, the thermal head 144 pinches the ink sheet 102 to bring it into contact with the image-receiving paper 104 located at the print start position.

The thermal head controller 142 starts printing the ink of the yellow ink sheet 102c on the image-receiving paper 104 on the basis of the yellow print data in accordance with a start control signal from the control unit 112. When yellow printing ends, the thermal head 144 moves to an intermediate position to release the ink sheet 102. The control unit 112 controls the conveying mechanism section 146 to move the image-receiving paper 104 back to the print start position again and to wind up the ink sheet 102 until the subsequent search marker 102b is detected. Subsequently, the thermal head controller 142 similarly prints the inks of the magenta ink sheet 102d and the cyan ink sheet 102e. Finally, the thermal head controller 142 causes the transparent overcoat material sheet 102f to thermally adhere to the image-receiving paper 104 on the basis of the overcoat layer print data in the overcoat layer data storage area 120.

Thus, as illustrated in FIG. 3A, the image-receiving layer 304 and the overcoat layer 308 are laminated on the image-receiving paper 104. When thermal adhesion of the overcoat layer 308 to the image-receiving paper 104 ends, the print processing section 140 moves the thermal head 144 to a standby position, and the control unit 112 controls the conveying mechanism section 146 to eject the image-receiving paper 104 onto an image-receiving paper stacking portion, which is a top surface of the image-receiving paper tray.

Figure 5:
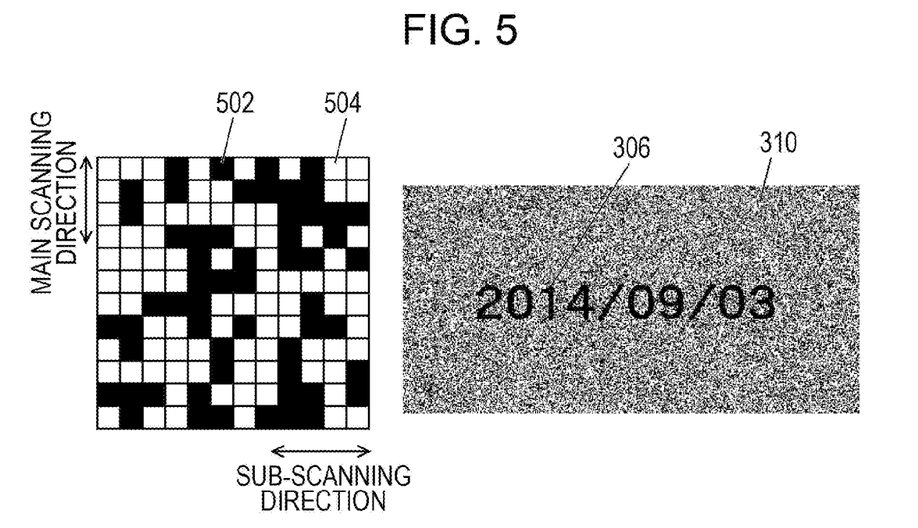
FIG. 5 illustrates an example where a mixture pattern and date information are combined in an overcoat layer in watermark printing.

FIG. 5 illustrates overcoat layer print data in watermark printing. A left diagram of FIG. 5 illustrates part of a mixture pattern of overcoat layer print data in which pixels having a low gradation value and pixels having a high gradation value are arranged randomly. A right diagram of FIG. 5 illustrates overcoat layer print data in which date data is combined with the mixture pattern illustrated in the left diagram of FIG. 5. In FIG. 5, a black pixel 502 refers to a pixel having a high gradation value, and a white pixel 504 refers to a pixel having a low gradation value. The width (size) of one pixel ranges from 80 to 90 μm. For example, assuming that thermal adhesion energy that causes the overcoat layer 308 to adhere is represented by 8 bits (256 levels of gradation), a gradation value of 0 is located on a low gradation value side and refers to that thermal adhesion energy as being small, and a gradation value of 255 is located on a high gradation value side and refers to that thermal adhesion energy as being large. In this embodiment, the pixel 502 has, as a high gradation value, a constant gradation value of equal to or greater than 200 (for example, a gradation value of 220). The pixel 504 has, as a low gradation value, any constant gradation value ranging from 70 to 140 (for example, a gradation value of 90). A gradation value does not have to be a constant value, and any value within each range may be used.

As illustrated in the right diagram of FIG. 5, the supplemental information 306 (image-capture date here) recorded in or fixed to the overcoat layer 308 is represented with a high gradation value, and the background portion 310 except characters of the supplemental information 306 is represented in the mixture pattern. When a mixture pattern having a low gradation value and a high gradation value is used for the background portion 310, the amount of reddish components caused by the low gradation value decrease and the amount of bluish-green components caused by the high gradation value increase in the background portion 310 as a whole. As a result, a difference in hue between the supplemental information 306 and the background portion 310 decreases.

When an overcoat layer is caused to thermally adhere to an image-receiving paper with a constant gradation value of about 90, its surface finish is a gloss finish. On the other hand, when an overcoat layer is caused to thermally adhere to an image-receiving paper with a constant gradation value of about 220, the surface thereof is roughened, and its surface finish is a matte finish. Thus, the mixture pattern of the background portion 310 in the right diagram of FIG. 5 includes a glossy surface and a matte surface, thereby resulting in a surface finish like a silky finish. With respect to the surface of a print obtained when a gloss mode is "gloss", the level of gloss measured by a 20° gloss meter is not less than 50, whereas with respect to the surface of a print obtained when a gloss mode is a mixture pattern, the level of gloss is not greater than 35. In the case of gloss reduction as well, the mixture pattern illustrated in the left diagram of FIG. 5 is employed for an overcoat layer (S408), and thus the surface of a print has a surface finish like a silky finish.

Figure 6:
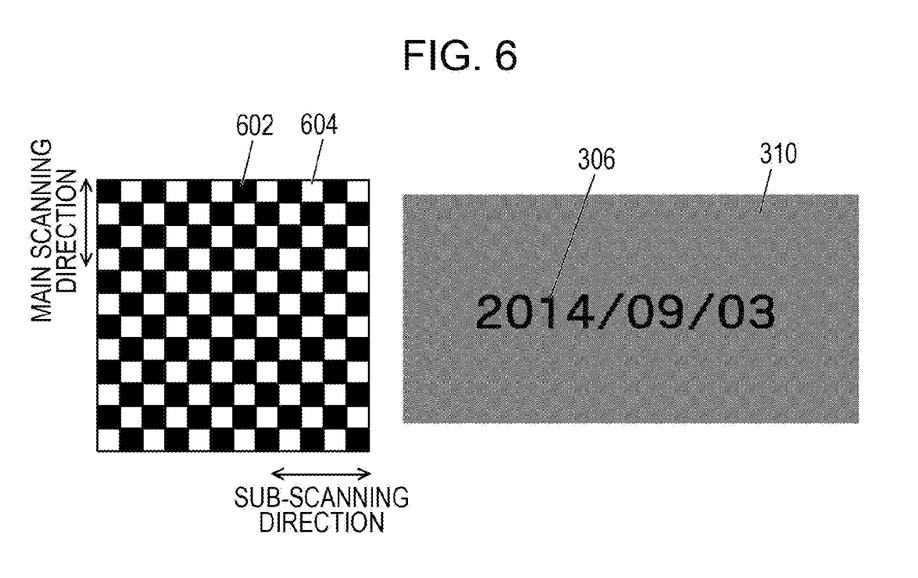
FIG. 6 illustrates an example where another mixture pattern and date information are combined in an overcoat layer in watermark printing.

FIG. 6 illustrates another example of a mixture pattern of overcoat layer print data in watermark printing. A left diagram of FIG. 6 illustrates an example of a mixture pattern of an overcoat layer in which pixels having a low gradation value and pixels having a high gradation value are arranged alternately in rows and columns. A right diagram of FIG. 6 illustrates overcoat layer print data in which date data is combined with the mixture pattern illustrated in the left diagram of FIG. 6. In FIG. 6, a black pixel 602 refers to a pixel having a high gradation value, and a white pixel 604 refers to a pixel having a low gradation value. The width (size) of one pixel ranges from 80 to 90 µm. Within 8-bit levels of gradation, the pixel 602 has, as a high gradation value, any constant gradation value ranging from 200 to 255, and the pixel 604 has, as a low gradation value, any constant gradation value ranging from 70 to 140. A gradation value does not have to be a constant value, and any value within each range may be used.

In the example illustrated in FIG. 6, although the background portion 310 is blurry on the diagram, it has a checkered pattern in which a high gradation value and a low gradation value are reversed every pixel (about 80 µm). When the overcoat layer 308 is caused to thermally adhere in this pattern, roughening due to thermal adhesion does not occur on the surface of the overcoat layer 308. Depressions due to thermal contraction can turn the interference color of the overcoat layer 308 blue, sizes of the formed depressions are not greater than the size of one pixel, and the depressions are not therefore visually identified. Thus, the mixture pattern illustrated in FIG. 6 enables a reduction in the difference in hue between the supplemental information 306 and the background portion 310 with the level of gloss being close to that of the surface of a print obtained by performing printing in "gloss" as a gloss mode.

The mixture pattern illustrated in FIG. 5 and the mixture pattern illustrated in FIG. 6 may be switched in accordance with a selection made via the gloss mode selection instruction unit 132. For example, assume that "gloss", "pattern 1", and "pattern 2" are selectable via the gloss mode selection instruction unit 132. If "gloss" is selected, an overcoat layer print pattern using only a low gradation value may be used. If "pattern 1" is selected, a random mixture pattern like the mixture pattern illustrated in FIG. 5 may be used. If "pattern 2" is selected, a checkered mixture pattern like the mixture pattern illustrated in FIG. 6 may be used.

Second Embodiment

In this embodiment, although a basic configuration is the same as the configuration in the first embodiment, overcoat layer print data generated when "watermark" is set for date printing differs from that in the first embodiment.

In the case where supplemental information is printed by using an overcoat layer, to facilitate visual identification of characters of the supplemental information, overcoat layer print data is generated so that the inside of a certain rectangular area around the characters of the supplemental information has a high gradation value.

Figure 7A:
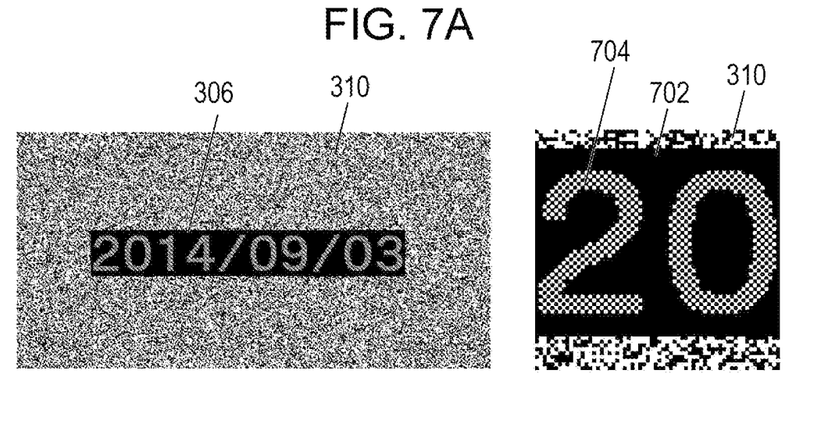
FIGS. 7A to 7C each illustrate an example where a mixture pattern and date information are combined in an overcoat layer in watermark printing.
Figure 7B:
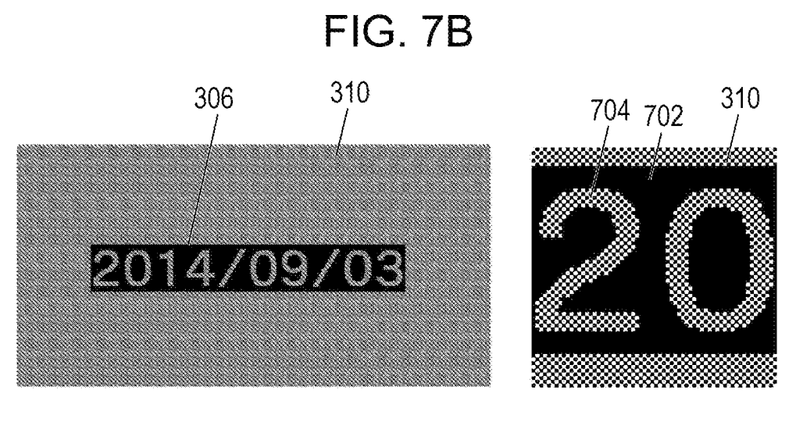
Figure 7C:
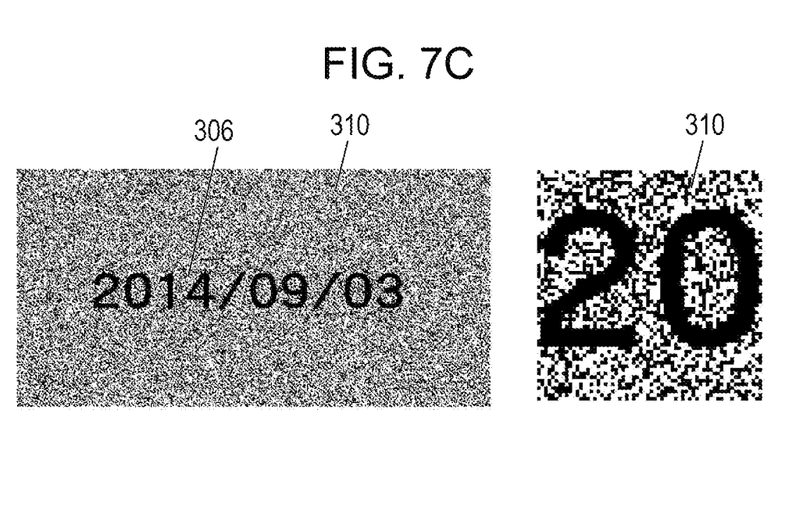

FIG. 7A illustrates an example of the case where supplemental information is combined with a random mixture pattern. A left diagram of FIG. 7A illustrates overcoat layer print data of a portion in which the supplemental information is combined, and a right diagram of FIG. 7A illustrates a partial enlargement of the portion in which the supplemental information is combined. FIG. 7B illustrates an example of the case where supplemental information is combined with a checkered mixture pattern. A left diagram of FIG. 7B illustrates overcoat layer print data of a portion in which the supplemental information is combined, and a right diagram of FIG. 7B illustrates a partial enlargement of the portion in which the supplemental information is combined. FIG. 7C illustrates an example of the case where supplemental information is combined as in FIG. 5 for purposes of comparison. Not an area around characters of the supplemental information but the supplemental information itself is formed with a high gradation value. A left diagram of FIG. 7C illustrates overcoat layer print data of a portion in which the supplemental information is combined, and a right diagram of FIG. 7C illustrates a partial enlargement of the portion in which the supplemental information is combined.

In FIGS. 7A to 7C, as in FIGS. 5 and 6, in overcoat layer print data, a portion having a high gradation value is represented by black, and a portion having a low gradation value is represented by white.

In the example illustrated in FIG. 7A, a character 704 of the supplemental information 306 is generated in the checkered mixture pattern within a frame 702 represented with the high gradation value. In the background portion 310, the random mixture pattern is used.

In the example illustrated in FIG. 7B, the character 704 of the supplemental information 306 is generated in the checkered mixture pattern within the frame 702 represented with the high gradation value. Unlike FIG. 7A, in the background portion 310, the checkered mixture pattern is used.

In the example illustrated in FIG. 7C, because characters represented with the high gradation value of the supplemental information 306 are represented by thin lines, their pixels are combined with pixels having the high gradation value in a mixture pattern of the background, and thus the lines constituting the characters appear to be blurred, thereby reducing readability of the supplemental information 306.

In contrast, in FIGS. 7A and 7B, the frame 702 of a rectangular area is provided around the characters and the inside of the frame 702 has the high gradation value, thereby facilitating identification of the area where the supplemental information 306 is combined. Furthermore, the characters themselves of the supplemental information 306 are represented in the checkered mixture pattern in which the high gradation value and the low gradation value are arranged regularly, thereby increasing the visibility of character content of the supplemental information 306 and providing good readability.

Thus, when a certain area around a character portion is represented by pixels having a high gradation value and characters of supplemental information are represented in a mixture pattern, good visibility and readability can be achieved. Other Embodiments Although the present disclosure is described in detail on the basis of the exemplary embodiments, the present invention is not limited to these particular embodiments, and various forms made within the scope of the gist of the present invention are also included in the present invention. Parts of the above-described embodiments may be appropriately combined.

In the above-described embodiments, as examples of a mixture pattern for gloss reduction printing, a checkered pattern and a random pattern are described. However, a mixture pattern is not limited to these, any overcoat layer pattern in which pixels having a low gradation value and pixels having a high gradation value are arranged may be used. In one or more embodiments, to enhance a gloss reduction effect, pixels having a low gradation value are arranged not in large clusters but in a scattered manner.

Although, in the above-described embodiments, a printing apparatus is described, one or more embodiments of the present disclosure may be implemented by a system in which such a printing apparatus is connected to a print control apparatus for controlling the printing apparatus. In this case, the print control apparatus may include functions of the operation section 130, the card reader 136, the display section 138, the main controller 110, and the like to execute the processes of steps S401 to S407.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), etc.) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-254330 filed Dec. 25, 2015, which is hereby incorporated by reference herein in its entirety.

What is claimed is:

1. A printing apparatus that prints an overcoat layer on printing paper on which a main image has been printed, the printing apparatus comprising:
    an acquisition unit configured to acquire supplemental information;
    a setting unit configured to set a gloss mode of an overcoat layer; and
    a control unit configured to perform control so that the overcoat layer is printed based on overcoat layer print data,
    wherein, in a case where the supplemental information acquired by the acquisition unit is printed by using an overcoat layer, the control unit performs control so that the overcoat layer is printed based on overcoat layer print data generated by combining the supplemental information formed in a mixture pattern for the supplemental information in which a high gradation value and a low gradation value are arranged alternately in rows and columns, with a mixture pattern for a background portion in which a high gradation value and a low gradation value are arranged,
    wherein the control unit performs control so that the overcoat layer is printed based on overcoat layer print data having a low gradation value if a first gloss mode is set by the setting unit, and performs control so that the overcoat layer is printed based on overcoat layer print data having a mixture pattern for the background portion in which a high gradation value and a low gradation value are arranged if a second gloss mode is set by the setting unit, and
    wherein, in a case where the supplemental information is printed by using an overcoat layer, even if the first gloss mode is set, the control unit performs control so that the overcoat layer is printed based on overcoat layer print data generated by combining the supplemental information with a mixture pattern for the background portion in which a high gradation value and a low gradation value are arranged.

2. The printing apparatus according to claim 1,
    wherein, in a case where the supplemental information is printed by using an overcoat layer, the control unit generates overcoat layer print data in which a high gradation value is arranged in an area around an area where the supplemental information is formed.

3. The printing apparatus according to claim 1,
    wherein the mixture pattern for the background portion is a pattern in which a low gradation value and a high gradation value are arranged randomly.

4. The printing apparatus according to claim 1,
wherein the mixture pattern for the background portion is a pattern in which a low gradation value and a high gradation value are arranged alternately in rows and columns.

5. The printing apparatus according to claim 1,
wherein, when gradation of the overcoat layer print data is represented by 8 bits, the high gradation value is a gradation value of equal to or greater than 200, and the low gradation value is a gradation value ranging from 70 to 140.

6. The printing apparatus according to claim 1,
wherein the supplemental information is image-capture date information of the main image, and
wherein the acquisition unit acquires the image-capture date information from a recording medium in which the main image is stored.

7. The printing apparatus according to claim 1, further comprising
a supplemental information print setting unit configured to set a setting specifying whether the supplemental information is to be printed,
wherein the supplemental information print setting unit can set a setting specifying whether the supplemental information is to be printed by using an overcoat layer or a color ink.

8. The printing apparatus according to claim 7,
wherein, if the supplemental information print setting unit sets a setting specifying that the supplemental information is to be printed by a color ink, the control unit performs control so that the supplemental information acquired by the acquisition unit is combined with the main image and is printed.

9. A print control method for printing an overcoat layer on printing paper on which a main image has been printed, the print control method comprising:
acquiring supplemental information;
setting a gloss mode of an overcoat layer; and
in a case where the supplemental information acquired in the acquiring step is printed by using an overcoat layer, performing control so that the overcoat layer is printed based on overcoat layer print data generated by combining the supplemental information formed in a mixture pattern for the supplemental information in which a high gradation value and a low gradation value are arranged alternately in rows and columns, with a mixture pattern for a background portion in which a high gradation value and a low gradation value are arranged,
wherein the performing performs control so that the overcoat layer is printed based on overcoat layer print data having a low gradation value if a first gloss mode is set, and the performing performs control so that the overcoat layer is printed based on overcoat layer print data having a mixture pattern for the background portion in which a high gradation value and a low gradation value are arranged if a second gloss mode is set, and
wherein, in a case where the supplemental information is printed by using an overcoat layer, even if the first gloss mode is set, the performing performs control so that the overcoat layer is printed based on overcoat layer print data generated by combining the supplemental information with a mixture pattern for the background portion in which a high gradation value and a low gradation value are arranged.

10. A non-transitory computer-readable storage medium storing a program for causing a computer to execute a print control method, the method comprising:
acquiring supplemental information;
setting a gloss mode of an overcoat layer; and
in a case where the supplemental information acquired in the acquiring step is printed by using an overcoat layer, performing control so that the overcoat layer is printed based on overcoat layer print data generated by combining the supplemental information formed in a mixture pattern for the supplemental information in which a high gradation value and a low gradation value are arranged alternately in rows and columns, with a mixture pattern for a background portion in which a high gradation value and a low gradation value are arranged,
wherein the performing performs control so that the overcoat layer is printed based on overcoat layer print data having a low gradation value if a first gloss mode is set, and the performing performs control so that the overcoat layer is printed based on overcoat layer print data having a mixture pattern for the background portion in which a high gradation value and a low gradation value are arranged if a second gloss mode is set, and
wherein, in a case where the supplemental information is printed by using an overcoat layer, even if the first gloss mode is set, the performing performs control so that the overcoat layer is printed based on overcoat layer print data generated by combining the supplemental information with a mixture pattern for the background portion in which a high gradation value and a low gradation value are arranged.

11. A printing apparatus that prints an overcoat layer on printing paper on which a main image has been printed, the printing apparatus comprising:
an acquisition unit configured to acquire supplemental information; and
a control unit configured to perform control so that the overcoat layer is printed based on overcoat layer print data,
wherein, in a case where the supplemental information acquired by the acquisition unit is printed by using an overcoat layer, the control unit performs control so that the overcoat layer is printed based on overcoat layer print data generated by combining the supplemental information formed in a mixture pattern for the supplemental information in which a high gradation value and a low gradation value are arranged alternately in rows and columns, with a mixture pattern for a background portion in which a high gradation value and a low gradation value are arranged, and
wherein, when gradation of the overcoat layer print data is represented by 8 bits, the high gradation value is a gradation value of equal to or greater than 200, and the low gradation value is a gradation value ranging from 70 to 140.

* * * * *